US009438468B2

(12) United States Patent
Xia et al.

(10) Patent No.: US 9,438,468 B2
(45) Date of Patent: Sep. 6, 2016

(54) METHOD AND APPARATUS FOR CREATING NETWORK DEVICES

(71) Applicant: HUAWEI TECHNOLOGIES CO., LTD., Shenzhen (CN)

(72) Inventors: Yinben Xia, Beijing (CN); Haiyang Zhang, Shenzhen (CN); Yuhong Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 483 days.

(21) Appl. No.: 13/944,069

(22) Filed: Jul. 17, 2013

(65) Prior Publication Data
US 2014/0025826 A1 Jan. 23, 2014

(30) Foreign Application Priority Data

Jul. 17, 2012 (CN) .......................... 2012 1 0247212

(51) Int. Cl.
H04L 12/24 (2006.01)
(52) U.S. Cl.
CPC ........... H04L 41/00 (2013.01); H04L 41/0806 (2013.01)
(58) Field of Classification Search
CPC ........................... H04L 41/00; H04L 41/0806
USPC ....................................................... 370/254
See application file for complete search history.

(56) References Cited

U.S. PATENT DOCUMENTS

| 8,141,156 B1 | 3/2012 | Mao et al. ...................... 726/23 |
| 8,954,574 B1* | 2/2015 | Chheda ................ G06Q 20/085 709/220 |
| 2004/0264384 A1* | 12/2004 | Deval ..................... H04L 45/02 370/252 |
| 2005/0286402 A1 | 12/2005 | Byun et al. |
| 2008/0177896 A1* | 7/2008 | Quinn ................... G06F 9/5055 709/238 |
| 2010/0043068 A1* | 2/2010 | Varadhan ............ H04L 12/4633 726/15 |
| 2010/0210256 A1 | 8/2010 | Shen et al. |

(Continued)

FOREIGN PATENT DOCUMENTS

CN 102347898 2/2012
EP 2 413 550 A1 2/2012

(Continued)

OTHER PUBLICATIONS

Decision to Grant issued Nov. 13, 2014 for corresponding Russian Patent Application No. 2013138364/08(058057).

(Continued)

Primary Examiner — Backhean Tiv
(74) Attorney, Agent, or Firm — Staas & Halsey LLP

(57) ABSTRACT

Embodiments of the present invention provide a method for creating network devices, where the method includes: creating multiple virtual hardware systems of control planes on a hardware system of a control plane of a physical network device; creating multiple virtual hardware systems of forwarding planes on a hardware system of a forwarding plane of the physical network device; loading multiple software systems of the control planes to the multiple virtual hardware systems of the control planes, respectively; loading multiple software systems of the forwarding planes to the multiple virtual hardware systems of the forwarding planes, respectively; creating multiple communication channels. In addition, a corresponding apparatus also provided. By using the technical solutions provided by the embodiments of the present invention, multiple virtual network devices can run software systems in different versions.

8 Claims, 6 Drawing Sheets

(56) References Cited

U.S. PATENT DOCUMENTS

| | | | |
|---|---|---|---|
| 2010/0227614 A1 | 9/2010 | Chun et al. | |
| 2012/0148238 A1* | 6/2012 | Ringen | H04Q 11/0062 398/45 |
| 2012/0189009 A1 | 7/2012 | Shekhar et al. | |
| 2013/0182605 A1* | 7/2013 | So | H04L 45/586 370/254 |
| 2013/0212241 A1* | 8/2013 | Kang | H04L 45/64 709/223 |
| 2014/0025826 A1* | 1/2014 | Xia | H04L 41/00 709/226 |

FOREIGN PATENT DOCUMENTS

| | | |
|---|---|---|
| RU | 2 338 326 C2 | 11/2008 |
| RU | 2 404 543 C2 | 11/2010 |
| WO | 2009/112929 A2 | 9/2009 |
| WO | WO 2010/129810 A2 | 11/2010 |
| WO | 2012/059130 A1 | 5/2012 |

OTHER PUBLICATIONS

Japanese Office Action mailed Jul. 29, 2014 in corresponding Japanese Patent Application No. 2013-147394.
"A network OS for integrated control plane and its application to OpenFlow controller", Shimonishi et al., The Institute of Electronics, Information and Communication Engineers, Technical Report, vol. 109, No. 448, Mar. 2010, pp. 2-18.
Chinese Office Action Issued on Jun. 13, 2014 in corresponding Chinese Patent Application No. 201210247212.0.
Extended European Search Report issued Jan. 27, 2014, in corresponding European Patent Application No. 13176689.1.

* cited by examiner

METHOD AND APPARATUS FOR CREATING NETWORK DEVICES

CROSS-REFERENCE TO RELATED APPLICATION

This application claims priority to Chinese Patent Application No. 201210247212.0, filed on Jul. 17, 2012, which is hereby incorporated by reference in its entirety.

TECHNICAL FIELD

The present invention relates to the field of communications, and in particular, to a method and an apparatus for creating network devices.

BACKGROUND

Generally, a network device has a control plane and a forwarding plane.

In the prior art, multiple software systems of control planes run in an operating system of a control plane of a physical network device to obtain multiple virtual network devices borne on the physical network device. In the prior art, the multiple virtual network devices borne on the physical network device can run software systems in the same version only, and cannot run software systems in different versions.

SUMMARY

An objective of the present invention is to provide a method and an apparatus for creating network devices, so that multiple virtual network devices can run software systems in different versions.

To achieve the foregoing objective, the following technical solutions are provided:

In a first aspect, a method for creating network devices is provided, including:

creating multiple virtual hardware systems of control planes on a hardware system of a control plane of a physical network device;

creating multiple virtual hardware systems of forwarding planes on a hardware system of a forwarding plane of the physical network device;

loading multiple software systems of the control planes to the multiple virtual hardware systems of the control planes, respectively, where the multiple virtual hardware systems of the control planes and the multiple software systems of the control planes are in one-to-one correspondence;

loading multiple software systems of the forwarding planes to the multiple virtual hardware systems of the forwarding planes, respectively, where the multiple virtual hardware systems of the forwarding planes and the multiple software systems of the forwarding planes are in one-to-one correspondence; and creating multiple communication channels, where the multiple communication channels are communication channels between the multiple software systems of the control planes and the multiple software systems of the forwarding planes, the multiple communication channel and the multiple software systems of the control planes are in one-to-one correspondence, and the multiple communication channels and the multiple software systems of the forwarding planes are in one-to-one correspondence.

In a first possible implementation mode of the method for creating network devices provided in the first aspect, the method further includes:

creating multiple virtual hardware systems of service planes on a hardware system of a service plane of the physical network device;

loading multiple software systems of the service planes to the multiple virtual hardware systems of the service planes, respectively, where the multiple virtual hardware systems of the service planes and the multiple software systems of the service planes are in one-to-one correspondence;

creating multiple first communication channels, where the multiple first communication channels are communication channels between the multiple software systems of the control planes and the multiple software systems of the service planes, the multiple first communication channel and the multiple software systems of the control planes are in one-to-one correspondence, and the multiple first communication channels and the multiple software systems of the service planes are in one-to-one correspondence; and creating multiple second communication channels, where the multiple second communication channels are communication channels between the multiple software systems of the forwarding planes and the multiple software systems of the service planes, the multiple second communication channel and the multiple software systems of the forwarding planes are in one-to-one correspondence, and the multiple second communication channels and the multiple software systems of the service planes are in one-to-one correspondence.

According to the method for creating network devices provided in the first aspect and the first possible implementation mode of the method for creating network devices provided in the first aspect, in a second possible implementation mode of the method for creating network devices provided in the first aspect, the creating multiple virtual hardware systems of control planes on a hardware system of a control plane of a physical network device includes:

instructing, by a virtual network device management system, a creating unit of the control plane to create the multiple virtual hardware systems of the control planes on the hardware system of the control plane of the physical network device;

the creating multiple virtual hardware systems of forwarding planes on a hardware system of a forwarding plane of the physical network device includes:

instructing, by the virtual network device management system, a creating unit of the forwarding plane to create the multiple virtual hardware systems of the forwarding planes on the hardware system of the forwarding plane of the physical network device;

the loading multiple software systems of the control planes to the multiple virtual hardware systems of the control planes, respectively includes:

instructing, by the virtual network device management system, the creating unit of the control plane to load the multiple software systems of the control planes to the multiple virtual hardware systems of the control planes, respectively; or loading, by the virtual network device management system, the multiple software systems of the control planes to the multiple virtual hardware systems of the control planes, respectively;

the loading multiple software systems of the forwarding planes to the multiple virtual hardware systems of the forwarding planes, respectively includes:

instructing, by the virtual network device management system, the creating unit of the forwarding plane to load the multiple software systems of the forwarding planes to the multiple virtual hardware systems of the forwarding planes, respectively; or loading, by the virtual network device management system, the multiple software systems of the forwarding planes to the multiple virtual hardware systems of the forwarding planes, respectively.

According to the first possible implementation mode of the method for creating network devices provided in the first aspect, in a third possible implementation mode of the method for creating network devices provided in the first aspect, the creating multiple virtual hardware systems of the service planes on a hardware system of a service plane of the physical network device includes:

instructing, by a virtual network device management system, a creating unit of the service plane to create the multiple virtual hardware systems of the service planes on a hardware system of the service plane of the physical network device;

the loading multiple software systems of the service planes to the multiple virtual hardware systems of the service planes, respectively includes:

instructing, by the virtual network device management system, the creating unit of the service plane to load the multiple software systems of the service planes to the multiple virtual hardware systems of the service planes, respectively; or loading, by the virtual network device management system, the multiple software systems of the service planes to the multiple virtual hardware systems of the service planes, respectively;

the creating multiple first communication channels includes:

instructing, by the virtual network device management system, the creating unit of the service plane to create the multiple first communication channels; or creating, by the virtual network device management system, the multiple first communication channels; and the creating multiple second communication channels includes:

instructing, by the virtual network device management system, the creating unit of the service plane to create the multiple second communication channels; or creating, by the virtual network device management system, the multiple second communication channels.

According to the method for creating network devices provided in the first aspect, in a fourth possible implementation mode of the method for creating network devices provided in the first aspect, one virtual hardware system of a control plane within the multiple virtual hardware systems of the control planes is adjusted to generate a new virtual hardware system of a control plane; or one virtual hardware system of a forwarding plane within the multiple virtual hardware systems of the forwarding planes is adjusted to generate a new virtual hardware system of a forwarding plane.

In a second aspect, an apparatus for creating network devices is provided, including:

a first creating unit, configured to create multiple virtual hardware systems of control planes on a hardware system of a control plane of a physical network device;

a second creating unit, configured to create multiple virtual hardware systems of forwarding planes on a hardware system of a forwarding plane of the physical network device;

a first loading unit, configured to load multiple software systems of the control planes to the multiple virtual hardware systems of the control planes, respectively, where the multiple virtual hardware systems of the control planes and the multiple software systems of the control planes are in one-to-one correspondence;

a second loading unit, configured to load multiple software systems of the forwarding planes to the multiple virtual hardware systems of the forwarding planes, respectively, where the multiple virtual hardware systems of the forwarding planes and the multiple software systems of the forwarding planes are in one-to-one correspondence; and a third creating unit, configured to create multiple communication channels, where the multiple communication channels are communication channels between the multiple software systems of the control planes and the multiple software systems of the forwarding planes, the multiple communication channels and the multiple software systems of the control planes are in one-to-one correspondence, and the multiple communication channels and the multiple software systems of the forwarding planes are in one-to-one correspondence.

In a first possible implementation mode of the apparatus for creating network devices provided in the second aspect, the apparatus further includes:

a fourth creating unit, configured to create multiple virtual hardware systems of service planes on a hardware system of a service plane of the physical network device;

a third loading unit, configured to load multiple software systems of the service planes to the multiple virtual hardware systems of the service planes, respectively, where the multiple virtual hardware systems of the service planes and the multiple software systems of the service planes are in one-to-one correspondence;

a fifth creating unit, configured to create multiple first communication channels, where the multiple first communication channels are communication channels between the multiple software systems of the control planes and the multiple software systems of the service planes, the multiple first communication channels and the multiple software systems of the control planes are in one-to-one correspondence, and the multiple first communication channels and the multiple software systems of the service planes are in one-to-one correspondence; and a sixth creating unit, configured to create multiple second communication channels, where the multiple second communication channels are communication channels between the multiple software systems of the forwarding planes and the multiple software systems of the service planes, the multiple second communication channels and the multiple software systems of the forwarding planes are in one-to-one correspondence, and the multiple second communication channels and the multiple software systems of the service planes are in one-to-one correspondence.

According to the apparatus for creating network devices provided in the second aspect and the first possible implementation mode of the apparatus for creating network devices provided in the second aspect, in a second possible implementation mode of the apparatus for creating network devices provided in the second aspect, the apparatus further includes a virtual network device management system, where:

the virtual network device management system is configured to instruct the first creating unit to create the multiple virtual hardware systems of the control planes;

the virtual network device management system is further configured to instruct the second creating unit to create the multiple virtual hardware systems of the forwarding planes on the hardware system of the forwarding plane of the physical network device;

the virtual network device management system is further configured to instruct the first loading unit to load the multiple software systems of the control planes to the multiple virtual hardware systems of the control planes, respectively, where the first loading unit is the first creating unit; or the virtual network device management system is further configured to load the multiple software systems of the control planes to the multiple virtual hardware systems of the control planes, respectively, where the virtual network device management system is the first loading unit; and the virtual network device management system is further configured to instruct the second loading unit to load the multiple software systems of the forwarding planes to the multiple virtual hardware systems of the forwarding planes, respectively, where the second loading unit is the second creating unit; or the virtual network device management system is further configured to load the multiple software systems of the forwarding planes to the multiple virtual hardware systems of the forwarding planes, respectively, where the virtual network device management system is the second loading unit.

According to the first possible implementation mode of the apparatus for creating network devices provided in the second aspect, in a third possible implementation mode of the apparatus for creating network devices provided in the second aspect, the apparatus further includes a virtual network device management system, where:

the virtual network device management system is configured to instruct the fourth creating unit to create the multiple virtual hardware systems of the service planes;

the virtual network device management system is further configured to instruct the third loading unit to load the multiple software systems of the service planes to the multiple virtual hardware systems of the service planes, respectively, where the third loading unit is the fourth creating unit; or the virtual network device management system is further configured to load the multiple software systems of the service planes to the multiple virtual hardware systems of the service planes, respectively, where the virtual network device management system is the third loading unit;

the virtual network device management system is further configured to instruct the fifth creating unit to create the multiple first communication channels; or the virtual network device management system is further configured to create the multiple first communication channels, where the virtual network device management system is the fifth creating unit; and the virtual network device management system is further configured to instruct the sixth creating unit to create the multiple second communication channels; or the virtual network device management system is further configured to create the multiple second communication channels, where the virtual network device management system is the sixth creating unit.

According to the apparatus for creating network devices provided in the second aspect, in a fourth possible implementation mode of the apparatus for creating network devices provided in the second aspect, the first creating unit is further configured to adjust one virtual hardware system of a control plane within the multiple virtual hardware systems of the control planes to generate a new hardware system of a control plane; or the second creating unit is further configured to adjust one virtual hardware system of a forwarding plane within the multiple virtual hardware systems of the forwarding planes to generate a new virtual hardware system of a forwarding plane.

In the foregoing technical solutions, multiple virtual hardware systems are created on the hardware system of the physical network device. Therefore, software systems in different versions can be loaded in the multiple virtual hardware systems, respectively. Therefore, by using the technical solutions provided by the embodiments of the present invention, multiple virtual network devices can run software systems in different versions.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1:
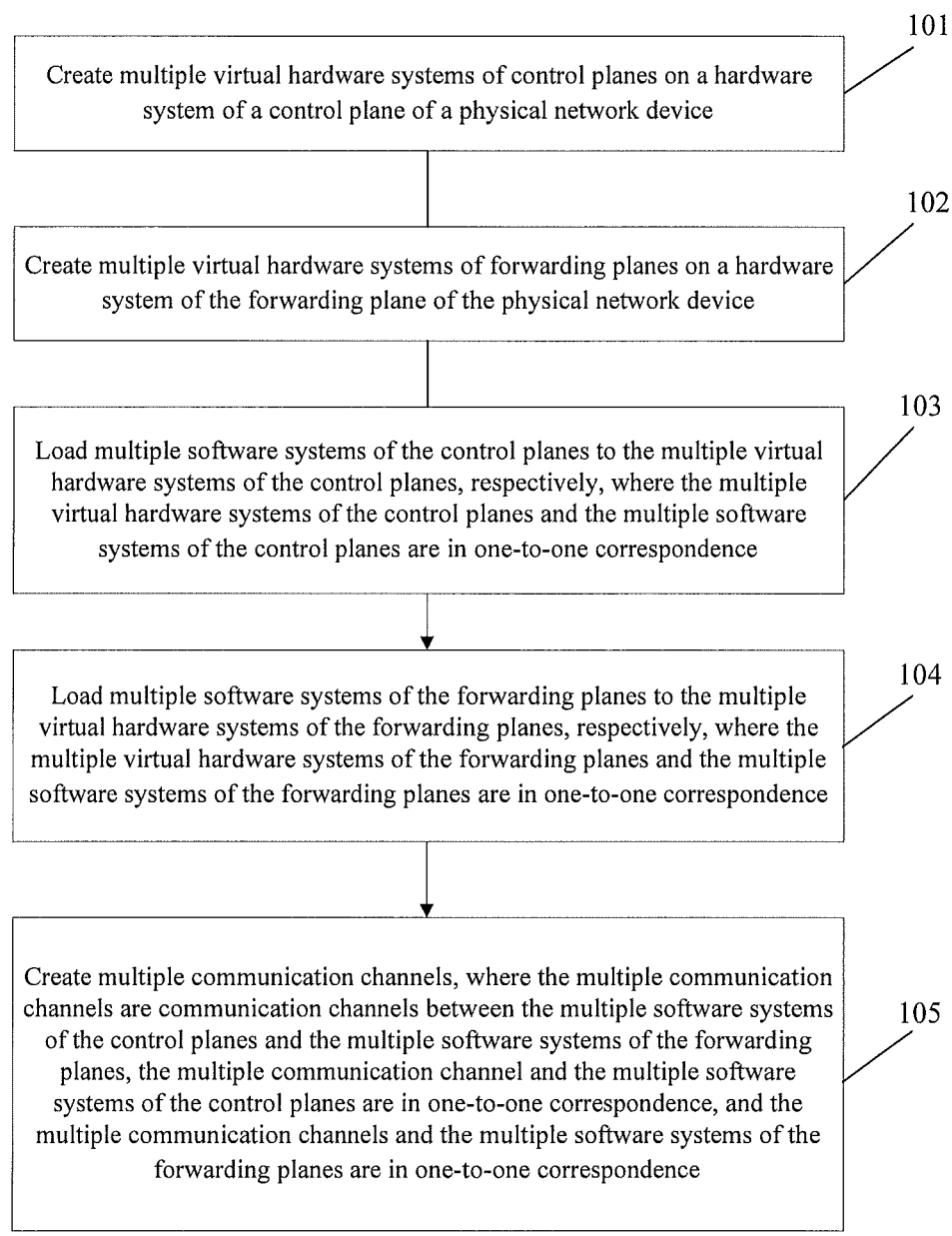
FIG. 1 is a schematic diagram of a method for creating network devices according to an embodiment of the present invention.

FIG. 1 is a flowchart of a method for creating network devices according to an embodiment of the present invention. As shown in FIG. 1, the method includes the following steps:

101. Create multiple virtual hardware systems of control planes on a hardware system of a control plane of a physical network device.

The physical network device refers to a network device including hardware. For example, the network device may be a router, a switch, a firewall or a load balancer.

The hardware system of the control plane of the physical network device may be a physical main processing unit (physical main processing unit, PMPU) of a physical router.

Step 101 may be performed by software or hardware. The software may be a hypervisor. For example, the hypervisor may be borne on the hardware system of the control plane of the physical network device. The hardware may be an application specific integrated circuit (application specific integrated circuit, ASIC).

If the physical network device is a physical router, the hardware system of the control plane of the physical network device may include a CPU, a memory, and a physical interface of the control plane. The physical interface of the control plane may include a physical interface used to communicate with a forwarding plane.

102. Create multiple virtual hardware systems of forwarding planes on a hardware system of the forwarding plane of the physical network device.

The hardware system of the forwarding plane of the physical network device may be a physical line processing unit (physical line processing unit, PLPU) of the physical router.

Step 102 may be performed by software or hardware. The software may be a hypervisor. For example, the hypervisor may be borne on the hardware system of the forwarding plane of the physical network device. The hardware may be the application specific integrated circuit.

If step 101 and step 102 are both performed by a hypervisor, the hypervisor corresponding to step 101 may be the same as or different from the hypervisor corresponding to step 102. For example, when the hardware system of the forwarding plane of the physical network device and the hardware system of the control plane of the physical network device are the PLPU and the PMPU, respectively, the hypervisor corresponding to step 101 may be different from the hypervisor corresponding to step 102. When the hardware system of the forwarding plane of the physical network device and the hardware system of the control plane of the physical network device are borne on the same chassis or borne on the same system on chip (system on chip, SoC), the hypervisor corresponding to step 101 may be the same as the hypervisor corresponding to step 102.

If the physical network device is a physical router, the hardware system of the forwarding plane of the physical network device may include a CPU, a network processor (network processor, NP), a memory, a traffic management (traffic management, TM) chip, and a physical interface of the forwarding plane. The physical interface of the forwarding plane may include a physical interface used to communicate with the control plane.

103. Load multiple software systems of the control planes to the multiple virtual hardware systems of the control planes, respectively, where the multiple virtual hardware systems of the control planes and the multiple software systems of the control planes are in one-to-one correspondence.

Step 103 may be performed by a hypervisor or a virtual network device management system. The virtual network device management system is configured to instruct a creating unit to create the multiple virtual hardware systems on the hardware system of the physical network device. The creating unit is software or hardware configured to create virtual hardware systems. The virtual network device management system may be located in the physical network device. The virtual network device management system may be a personal computer (personal computer, PC). When the virtual network device management system is a personal computer, the virtual network device management system can communicate with the physical network device by using a communication interface. When step 103 is performed by a hypervisor, the virtual network device management system may instruct the hypervisor to perform the operation in step 103.

The multiple software systems of the control planes include at least two software systems of control planes. If the multiple software systems of the control planes include two software systems of control planes, the two software systems of the control planes may be a same software system of a control plane or be different software systems of the control planes.

For example, the software system of the control plane may be a versatile routing platform (versatile routing platform, VRP) provided by Huawei Technologies. The software system of the control plane may also be an Internetworking Operating System (IOS) provided by Cisco Systems. Software systems of the control plane in different versions may be different software systems of the control plane. For example, a versatile routing platform version 5 (versatile routing platform version 5, VRP v5) and a versatile routing platform version 8 (versatile routing platform version 8, VRP v8) are different software systems of the control plane.

104. Load multiple software systems of the forwarding planes to the multiple virtual hardware systems of the forwarding planes, respectively, where the multiple virtual hardware systems of the forwarding planes and the multiple software systems of the forwarding planes are in one-to-one correspondence.

104 may be performed by the hypervisor or the virtual network device management system. When step 104 is performed by the hypervisor, the virtual network device management system may instruct the hypervisor to perform the operation in step 104.

The multiple software systems of the forwarding planes include at least two software systems of forwarding planes. If the multiple software systems of the forwarding planes include two software systems of forwarding planes, the two software systems of the forwarding planes may be a same software system of a forwarding plane or be different software systems of the forwarding planes.

105. Create multiple communication channels, where the multiple communication channels are communication channels between the multiple software systems of the control planes and the multiple software systems of the forwarding planes, the multiple communication channel and the multiple software systems of the control planes are in one-to-one correspondence, and the multiple communication channels and the multiple software systems of the forwarding planes are in one-to-one correspondence.

Step 105 may be performed by the virtual network device management system. 105 may also be performed by the hypervisor.

The multiple communication channels are channels through which the multiple software systems of the control planes communicate with the multiple software systems of the forwarding planes.

For example, the multiple communication channels may be mapping relationships. For example, the mapping relationships may be mapping tables. The mapping relationships may include a first mapping relationship and a second mapping relationship. The first mapping relationship is a mapping relationship that needs to be used for transmitting a first packet from the multiple software systems of the forwarding planes to the multiple software systems of the control planes. The first packet may be a packet received by the physical network device. The second mapping relationship is a mapping relationship that needs to be used for transmitting a second packet from the multiple software systems of the control planes to the multiple software systems of the forwarding planes. The second packet may be a packet received by the physical network device or be a packet generated by the physical network device.

For example, the multiple software systems of the forwarding planes and the multiple software systems of the control planes are in one-to-one correspondence. Each of the multiple software systems of the forwarding planes may include one or more virtual line processing units (VLPUs). Each of the multiple software systems of the control planes may include one or more virtual main processing units (virtual main processing unit, VMPU). For example, according to the method illustrated in FIG. 1, multiple virtual network devices (virtual network device, VND) can be created. The multiple virtual network devices include the multiple software systems of the forwarding planes and the multiple software systems of the control planes. Any one virtual network device of the multiple virtual network devices includes software system of a forwarding plane corresponding to the virtual network device and software system of a control plane corresponding to the virtual network device. Each of the multiple virtual network devices may include at least one virtual main processing unit and at least one virtual line processing unit. Each virtual main processing unit of the at least one virtual main processing units corresponds to an identity of the virtual main processing unit. Each virtual line processing unit of the at least one virtual line processing units corresponds to an identity of the virtual line processing unit. Each of the multiple virtual network devices corresponds to an identity of the virtual network device.

For example, the first mapping relationship may include a first matching domain and a first action domain. The first matching domain may include a physical ingress interface of the physical network device used to receive the first packet. The first action domain may further include one or more fields in a header of the first packet. The first matching domain is used to determine whether the packet received by the physical network device matches the first mapping relationship. The first action domain may include an identity of a first virtual network device, where the first virtual network device is one of the multiple virtual network devices. The first action domain may further include an identity of a virtual main processing unit in the first virtual network device. The identity of the first virtual network device in the first action domain is used to indicate that an entity processing the first packet is the first virtual network device. The identity of a virtual main processing unit in the first virtual network device is used to indicate a destination unit of the first packet.

For example, the first mapping relationship may be generated by the virtual network device management system, and may also be generated by the hypervisor borne on the hardware system of the forwarding plane of the physical network device. Specifically, in a scenario in which the virtual network device management system generates the first mapping relationship, a user can log in to the virtual network device management system, and enters a first command line to the virtual network device management system. The virtual network device management system generates the first mapping relationship according to the first command line, and loads the first mapping relationship to the software systems of the service plane of the physical network device. In a scenario in which the hypervisor borne on the hardware system of the forwarding plane of the physical network device generates the first mapping relationship, the virtual network device management system sends a rule for generating the first mapping relationship to a hypervisor borne on the hardware system of the forwarding plane of the physical network device. After receiving the rule for generating the first mapping relationship, the hypervisor borne on the hardware system of the forwarding plane of the physical network device generates the first mapping relationship according to the rule for generating the first mapping relationship. The following describes how the physical network device processes the first packet according to the first mapping relationship after receiving the first packet. For example, after the hardware system of the forwarding plane of the physical network system receives the first packet, the hypervisor borne on the hardware system of the forwarding plane of the physical network device can determine, according to the first mapping relationship, that an entity processing the first packet is the first virtual network device and a destination unit of the first packet is a virtual main processing unit in the first virtual network device. The hypervisor borne on the hardware system of the forwarding plane of the physical network device sends the first packet to the hardware system of the control plane of the physical network device. The hypervisor borne on the hardware system of the control plane of the physical network device instructs a virtual main processing unit corresponding to the identity of a virtual main processing unit in the first virtual network device in the first action domain to process the first packet.

For example, the second mapping relationship may include a second matching domain and a second action domain. The second matching domain may include an identity of a virtual line processing unit configured to forward the second packet. The second action domain may further include one or more fields in a header of the second packet. The second matching domain is used to determine whether the packets received by the multiple software systems of the control planes match the second mapping relationship. The second action domain may include an identity of a second virtual network device, where the second virtual network device is one of the multiple virtual network devices. The second action domain may further include an identity of a virtual line processing unit in the second virtual network device. The identity of the second virtual network device in the second action domain is used to indicate that an entity processing the second packet is the second virtual network device. The identity of a virtual line processing unit in the second virtual network device is used to indicate a destination unit of the second packet.

For example, the second mapping relationship may be generated by the virtual network device management system, and may also be generated by the hypervisor borne on the hardware system of the control plane of the physical network device. Specifically, in a scenario in which the virtual network device management system generates the second mapping relationship, a user can log in to the virtual network device management system, and enters a second command line to the virtual network device management system. The virtual network device management system generates the second mapping relationship according to the second command line, and loads the second mapping relationship to the software systems of the control plane of the physical network device. In a scenario in which the hypervisor borne on the hardware system of the control plane of the physical network device generates the second mapping relationship, the virtual network device management system sends a rule for generating the second mapping relationship to a hypervisor borne on the hardware system of the control plane of the physical network device. After receiving the rule for generating the second mapping relationship, the hypervisor borne on the hardware system of the control plane of the physical network device generates the second mapping relationship according to the rule for generating the second mapping relationship. The following describes how the physical network device processes the second packet according to the second mapping relationship. For example, after the hardware system of the control plane of the physical network system receives the second packet, the hypervisor borne on the hardware system of the control plane of the physical network device determines, according to the second mapping relationship, that an entity processing the second packet is the second virtual network device and a destination unit of the second packet is a virtual line processing unit in the second virtual network device. The hypervisor borne on the hardware system of the control plane of the physical network device sends the second packet to the hardware system of the forwarding plane of the physical network device. The hypervisor borne on the hardware system of the forwarding plane of the physical network device instructs a virtual line processing unit corresponding to the identity of a virtual line processing unit in the second virtual network device in the second action domain to process the second packet.

In the foregoing technical solution, multiple virtual hardware systems are created on the hardware system of the physical network device. Therefore, software systems in different versions can be loaded in the multiple virtual hardware systems, respectively. Therefore, by using the technical solution provided by the embodiment of the present invention, multiple virtual network devices can run software systems in different versions.

Figure 2:
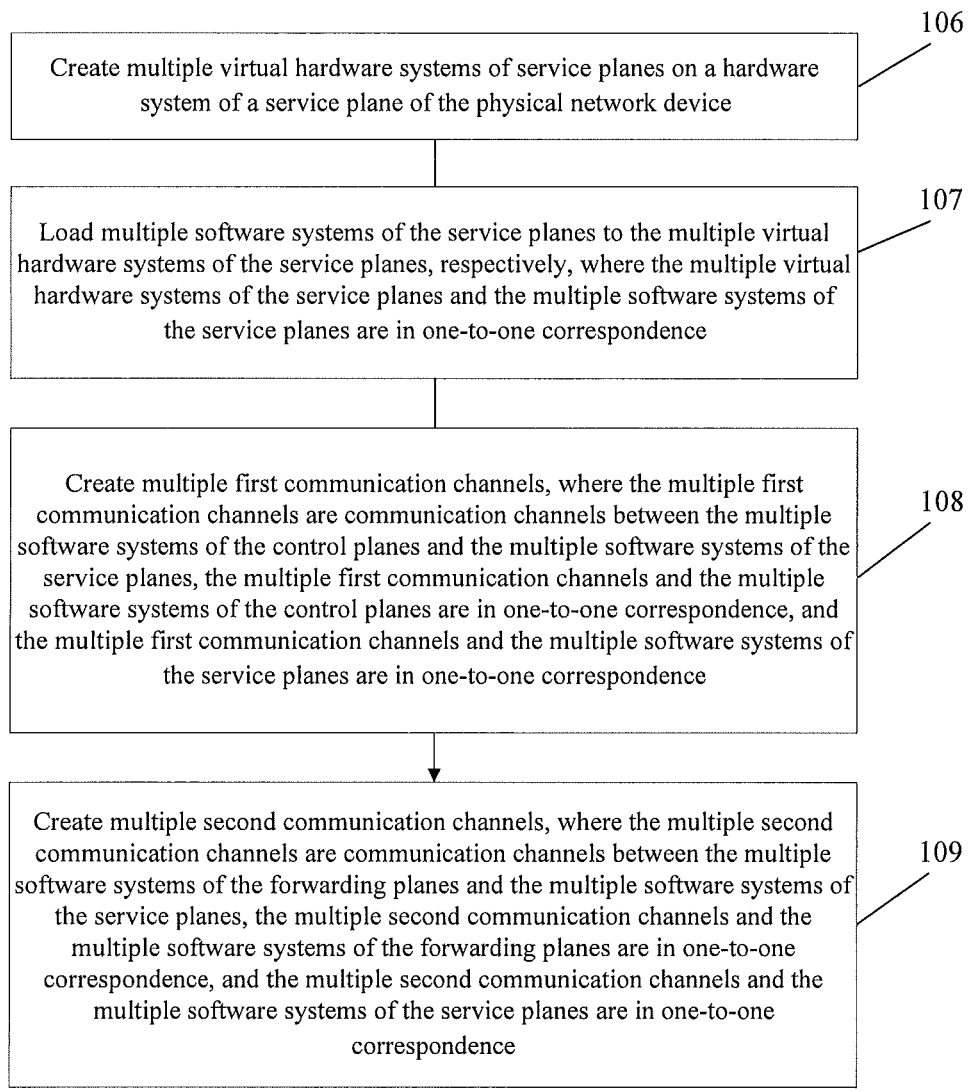
FIG. 2 is another schematic diagram of a method for creating network devices according to an embodiment of the present invention.

Alternatively, the method illustrated in FIG. 1 may be extended. For details, reference may be made to FIG. 2.

Alternatively, the method illustrated in FIG. 1 may further include the following steps:

106. Create multiple virtual hardware systems of service planes on a hardware system of a service plane of the physical network device.

For example, a service corresponding to a software system of a service plane in the multiple software systems of the service planes may be a firewall service, a network address translation (network address translation, NAT) service or a video service.

The hardware system of the service plane of the physical network device may be a physical service processing unit (physical main processing unit, PMPU) of the physical router.

Step 106 may be performed by software or hardware. The software may be a hypervisor. For example, the hypervisor may be borne on the hardware system of the service plane of the physical network device. The hardware may be an application specific integrated circuit.

If the physical network device is a physical router, the hardware system of the service plane of the physical network device may include a CPU, a memory, and a physical interface of the service plane. The physical interface of the service plane may include a physical interface used to communicate with the forwarding plane. The physical interface of the service plane may also include a physical interface used to communicate with the control plane.

107. Load multiple software systems of the service planes to the multiple virtual hardware systems of the service planes, respectively, where the multiple virtual hardware systems of the service planes and the multiple software systems of the service planes are in one-to-one correspondence.

Step 107 may be performed by the hypervisor or the virtual network device management system. When step 107 is performed by the hypervisor, the virtual network device management system may instruct the hypervisor to perform the operation in step 107.

The multiple software systems of the service planes include at least two software systems of service planes. If the multiple software systems of the service planes include two software systems of service planes, the two software systems of the service planes may be a same software system of a service plane or be different software systems of the service planes.

108. Create multiple first communication channels, where the multiple first communication channels are communication channels between the multiple software systems of the control planes and the multiple software systems of the service planes, the multiple first communication channels and the multiple software systems of the control planes are in one-to-one correspondence, and the multiple first communication channels and the multiple software systems of the service planes are in one-to-one correspondence.

Step 108 may be performed by the virtual network device management system. Step 108 may also be performed by the hypervisor. For example, step 108 may be performed by the hypervisor borne on the hardware system of the control plane of the physical network device and the hypervisor borne on the hardware system of the service plane of the physical network device.

For example, the multiple first communication channels are channels through which the multiple software systems of the control planes communicate with the multiple software systems of the service planes. For details about the multiple first communication channels, reference may be made to the mapping relationships, which are not further described herein.

For example, the multiple software systems of the service planes and the multiple software systems of the control planes are in one-to-one correspondence. Each of the multiple software systems of the service planes may include one or more virtual service processing units (virtual main processing unit, VSPU). For example, according to the method illustrated in FIG. 1, multiple virtual network devices can be created. The multiple virtual network devices include the multiple software systems of the forwarding planes, the multiple software systems of the control planes, and the multiple software systems of the service planes. Any one virtual network device of the multiple virtual network devices includes a software system of a forwarding plane corresponding to the virtual network device and software system of a control plane corresponding to the virtual network device. Each of the multiple virtual network devices may include at least one virtual service processing units. Each virtual line processing unit of the at least one virtual service processing units corresponds to an identity of the virtual line processing unit.

109. Create multiple second communication channels, where the multiple second communication channels are communication channels between the multiple software systems of the forwarding planes and the multiple software systems of the service planes, the multiple second communication channels and the multiple software systems of the forwarding planes are in one-to-one correspondence, and the multiple second communication channels and the multiple software systems of the service planes are in one-to-one correspondence.

Step 109 may be performed by the virtual network device management system. Step 109 may also be performed by the hypervisor. For example, step 109 may be performed by the hypervisor borne on the hardware system of the service plane of the physical network device and the hypervisor borne on the hardware system of the service plane of the physical network device.

For example, the multiple second communication channels are channels through which the multiple software systems of the forwarding planes communicate with the multiple software systems of the service planes. For details about the multiple second communication channels, reference may be made to the mapping relationships, which are not further described herein.

Figure 3:
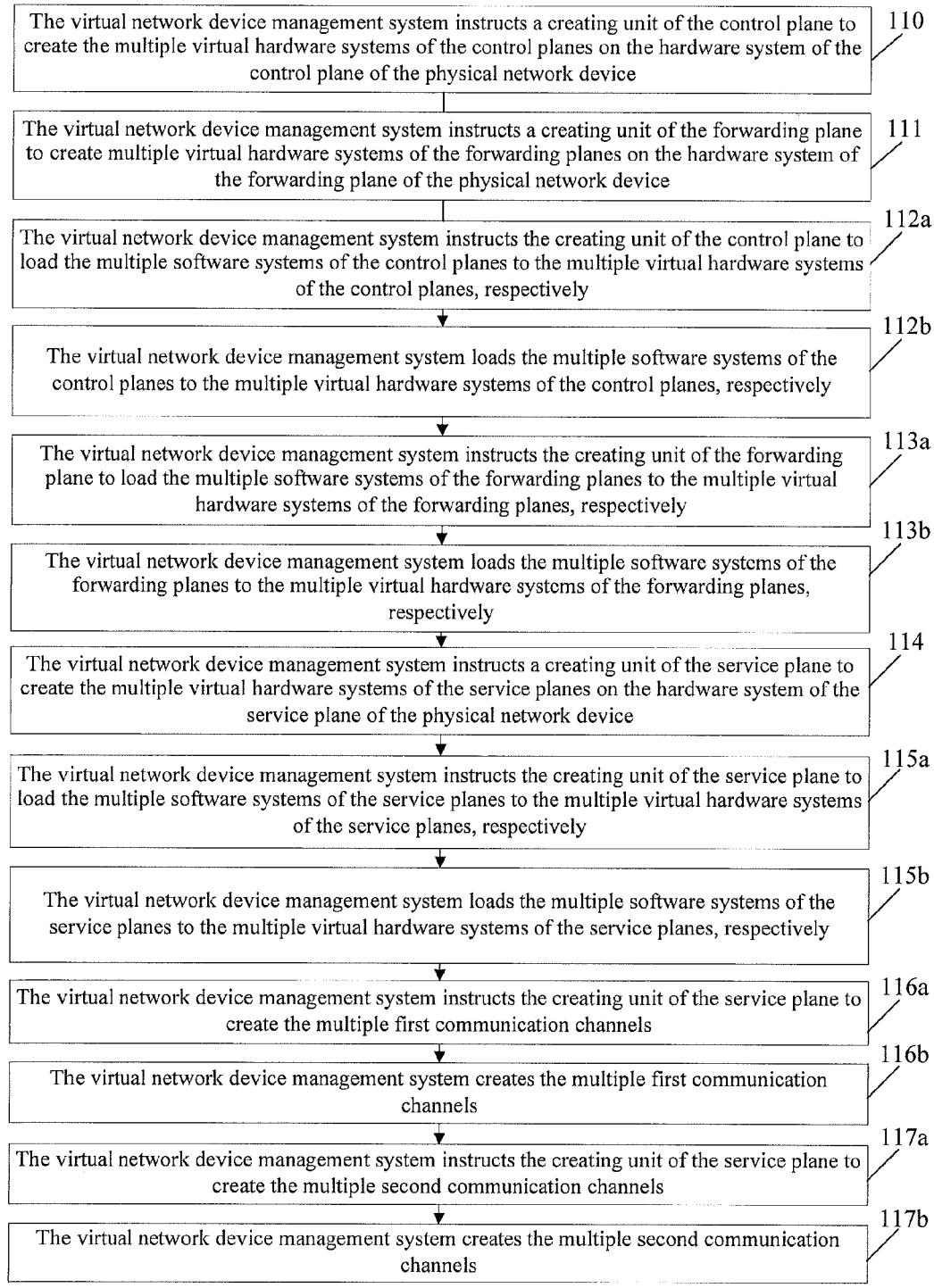
FIG. 3 is another schematic diagram of a method for creating network devices according to an embodiment of the present invention.

Alternatively, the method illustrated in FIG. 1 may be extended. For details, reference may be made to FIG. 3.

Alternatively, in the method illustrated in FIG. 1, the creating multiple virtual hardware systems of control planes on a hardware system of a control plane of a physical network device may include the following step:

110. The virtual network device management system instructs a creating unit of the control plane to create the multiple virtual hardware systems of the control planes on the hardware system of the control plane of the physical network device.

For example, the creating unit of the control plane is software or hardware configured to create a virtual hardware system of a control plane. For example, the software configured to create the virtual hardware system may be the hypervisor borne on the hardware system of the control plane of the physical network device.

Alternatively, in the method illustrated in FIG. 1, the creating multiple virtual hardware systems of forwarding planes on a hardware system of a forwarding plane of the physical network device may include the following step:

111. The virtual network device management system instructs a creating unit of the forwarding plane to create multiple virtual hardware systems of the forwarding planes on the hardware system of the forwarding plane of the physical network device.

For example, the creating unit of the forwarding plane is software or hardware configured to create virtual hardware systems of the forwarding plane. For example, the software configured to create virtual hardware systems may be the hypervisor borne on the hardware system of the forwarding plane of the physical network device.

Alternatively, in the method illustrated in FIG. 1, the loading multiple software systems of the control planes to the multiple virtual hardware systems of the control planes, respectively includes the following step:

112*a*. The virtual network device management system instructs the creating unit of the control plane to load the multiple software systems of the control planes to the multiple virtual hardware systems of the control planes, respectively; or

112*b*. The virtual network device management system loads the multiple software systems of the control planes to the multiple virtual hardware systems of the control planes, respectively.

Alternatively, in the method illustrated in FIG. 1, the loading multiple software systems of the forwarding planes to the multiple virtual hardware systems of the forwarding planes, respectively includes the following step:

113*a*. The virtual network device management system instructs the creating unit of the forwarding plane to load the multiple software systems of the forwarding planes to the multiple virtual hardware systems of the forwarding planes, respectively; or

113*b*. The virtual network device management system loads the multiple software systems of the forwarding planes to the multiple virtual hardware systems of the forwarding planes, respectively.

Alternatively, in the method illustrated in FIG. 1, the creating multiple virtual hardware systems of the service planes on a hardware system of a service plane of the physical network device may include the following step:

114. The virtual network device management system instructs a creating unit of the service plane to create the multiple virtual hardware systems of the service planes on the hardware system of the service plane of the physical network device.

For example, the creating unit of the service plane is software or hardware configured to create a virtual hardware system of a service plane. For example, the software configured to create the virtual hardware system may be the hypervisor borne on the hardware system of the service plane of the physical network device.

Alternatively, in the method illustrated in FIG. 1, the loading multiple software systems of the service planes to the multiple virtual hardware systems of the service planes, respectively includes the following step:

115*a*. The virtual network device management system instructs the creating unit of the service plane to load the multiple software systems of the service planes to the multiple virtual hardware systems of the service planes, respectively; or

115*b*. The virtual network device management system loads the multiple software systems of the service planes to the multiple virtual hardware systems of the service planes, respectively.

Optionally, in the method illustrated in FIG. 1, the creating multiple first communication channels includes the following step:

116*a*. The virtual network device management system instructs the creating unit of the service plane to create the multiple first communication channels; or

116*b*. The virtual network device management system creates the multiple first communication channels.

Alternatively, in the method illustrated in FIG. 1, the creating multiple second communication channels includes the following step:

117*a*. The virtual network device management system instructs the creating unit of the service plane to create the multiple second communication channels; or

117*b*. The virtual network device management system creates the multiple second communication channels.

Figure 4:
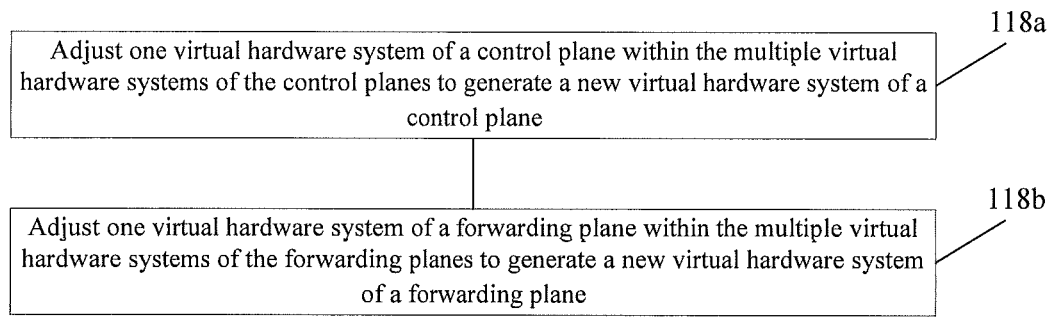
FIG. 4 is another schematic diagram of a method for creating network devices according to an embodiment of the present invention.

Alternatively, the method illustrated in FIG. 1 may be extended. For details, reference may be made to FIG. 4.

Alternatively, the method illustrated in FIG. 1 may further include the following steps:

118*a*. Adjust one virtual hardware system of a control plane within the multiple virtual hardware systems of the control planes to generate a new virtual hardware system of a control plane; or

118*b*. Adjust one virtual hardware system of a forwarding plane within the multiple virtual hardware systems of the forwarding planes to generate a new virtual hardware system of a forwarding plane.

For example, the one virtual hardware system of a control plane within the multiple virtual hardware systems of the control planes may include a memory. The memory may be one gigabyte (gigabyte). The memory of the new virtual hardware system of the control plane is two gigabytes.

For example, the one virtual hardware system of a forwarding plane within the multiple virtual hardware systems of the forwarding planes may include a memory. The memory may be one gigabyte. The memory of the new virtual hardware system of the forwarding plane may be two gigabytes.

Figure 7:
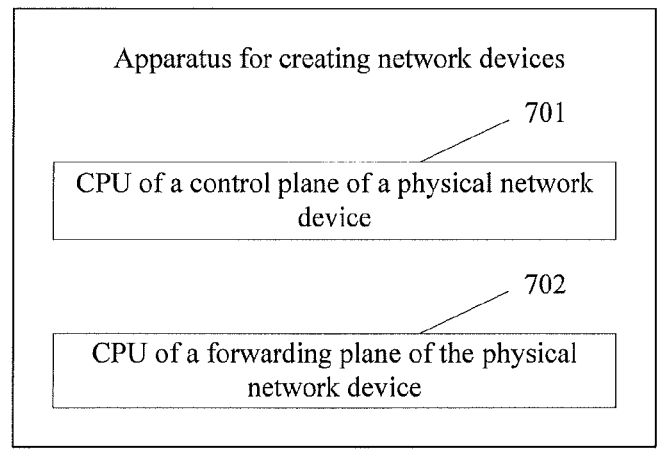
FIG. 7 is another schematic structural diagram of an apparatus for creating network devices according to an embodiment of the present invention.

Alternatively, an embodiment of the present invention provides an apparatus for creating network devices. The apparatus for creating network devices may perform the method illustrated in FIG. 1. As shown in FIG. 7, the apparatus includes:

a CPU 701 of a control plane of a physical network device, configured to create multiple virtual hardware systems of control planes on a hardware system of the control plane of the physical network device and load multiple software systems of the control planes to the multiple virtual hardware systems of the control planes, respectively, where the multiple virtual hardware systems of the control planes and the multiple software systems of the control planes are in one-to-one correspondence.

The CPU 701 of the control plane of the physical network device can perform step 101 and step 103 of the method illustrated in FIG. 1. For example, the CPU 701 of the control plane of the physical network device can perform step 101 and step 103 of the method illustrated in FIG. 1 by using a hypervisor borne on the hardware system of the control plane of the physical network device. For details about the CPU 701 of the control plane of the physical network device, reference may be made to step 101 and step 103 of the method illustrated in FIG. 1, which is not further described herein.

a CPU 702 of a forwarding plane of the physical network device, configured to create multiple virtual hardware systems of forwarding planes on a hardware system of the forwarding plane of the physical network device and load multiple software systems of the forwarding planes to the multiple virtual hardware systems of the forwarding planes, respectively, where the multiple virtual hardware systems of the forwarding planes and the multiple software systems of the forwarding planes are in one-to-one correspondence.

The CPU 702 of the forwarding plane of the physical network device can perform step 102 and step 104 of the method illustrated in FIG. 1. For example, the CPU 702 of the forwarding plane of the physical network device can perform step 102 and step 104 of the method illustrated in FIG. 1 by using a hypervisor borne on the hardware system of the forwarding plane of the physical network device. For details about the CPU 702 of the forwarding plane of the physical network device, reference may be made to step 102 and 104 of the method illustrated in FIG. 1, which is not further described herein.

The CPU 701 of the control plane of the physical network device and the CPU 702 of the forwarding plane of the physical network device are further configured to create multiple communication channels, where the multiple communication channels are communication channels between the multiple software systems of the control planes and the multiple software systems of the forwarding planes, the multiple communication channels and the multiple software systems of the control planes are in one-to-one correspondence, and the multiple communication channels and the multiple software systems of the forwarding planes are in one-to-one correspondence.

The CPU 701 of the control plane of the physical network device and the CPU 702 of the forwarding plane of the physical network device can perform 105 of the method illustrated in FIG. 1. For details about the CPU 701 of the control plane of the physical network device and the CPU 702 of the forwarding plane of the physical network device, reference may be made to step 105 of the method illustrated in FIG. 1, which is not further described herein.

In the foregoing technical solution, multiple virtual hardware systems are created on the hardware system of the physical network device. Therefore, software systems in different versions can be loaded in the multiple virtual hardware systems, respectively. Therefore, by using the technical solution provided by the embodiment of the present invention, multiple virtual network devices can run software systems in different versions.

Alternatively, the apparatus illustrated in FIG. 7 may further include:

a CPU 703 of a service plane of the physical network device, configured to create multiple virtual hardware systems of the service planes on a hardware system of the service plane of the physical network device and load multiple software systems of the service planes to the multiple virtual hardware systems of the service planes, respectively, where the multiple virtual hardware systems of the service planes and the multiple software systems of the service planes are in one-to-one correspondence.

Figure 8:
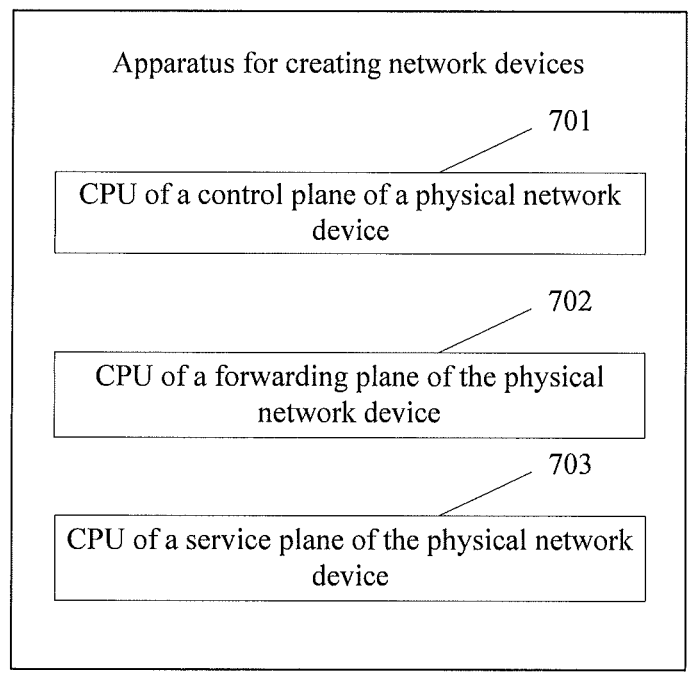
FIG. 8 is another schematic structural diagram of an apparatus for creating network devices according to an embodiment of the present invention.

For details about the CPU 703 of the service plane of the physical network device, reference may be made to FIG. 8.

The CPU 703 of the service plane of the physical network device can perform step 106 and step 107 of the method illustrated in FIG. 1. For example, the CPU 703 of the service plane of the physical network device can perform step 106 and step 107 of the method illustrated in FIG. 1 by using a hypervisor borne on the hardware system of the service plane of the physical network device. For details about the CPU 703 of the service plane of the physical network device, reference may be made to step 106 and step 107 of the method illustrated in FIG. 1, which is not further described herein.

The CPU 701 of the control plane of the physical network device and the CPU 703 of the service plane of the physical network device may be further configured to create multiple first communication channels, where the multiple first communication channels are communication channels between the multiple software systems of the control planes and the multiple software systems of the service planes, the multiple first communication channels and the multiple software systems of the control planes are in one-to-one correspondence, and the multiple first communication channels and the multiple software systems of the service planes are in one-to-one correspondence.

The CPU 701 of the control plane of the physical network device and the CPU 703 of the service plane of the physical network device can perform step 108 of the method illustrated in FIG. 1. For details about the CPU 701 of the control plane of the physical network device and the CPU 703 of the service plane of the physical network device, reference may be made to step 108 of the method illustrated in FIG. 1, which is not further described herein.

The CPU 702 of the forwarding plane of the physical network device and the CPU 703 of the service plane of the physical network device may be further configured to create multiple second communication channels, where the multiple second communication channels are communication channels between the multiple software systems of the forwarding planes and the multiple software systems of the service planes, the multiple second communication channels and the multiple software systems of the forwarding planes are in one-to-one correspondence, and the multiple second communication channels and the multiple software systems of the service planes are in one-to-one correspondence.

The CPU 702 of the forwarding plane of the physical network device and the CPU 703 of the service plane of the physical network device can perform step 109 of the method illustrated in FIG. 1. For details about the CPU 702 of the forwarding plane of the physical network device and the CPU 703 of the service plane of the physical network device, reference may be made to step 109 of the method illustrated in FIG. 1, which is not further described herein.

Figure 5:
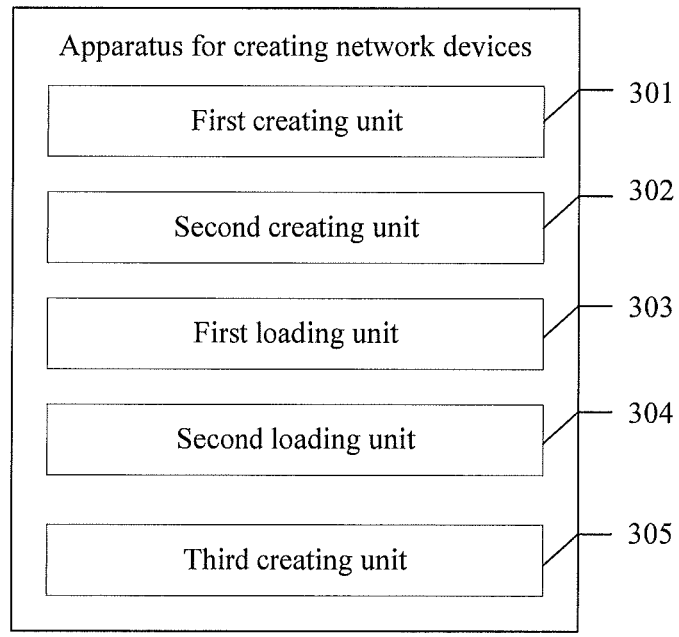
FIG. 5 is a schematic structural diagram of an apparatus for creating network devices according to an embodiment of the present invention.

FIG. 5 is a schematic structural diagram of an apparatus for creating network devices according to an embodiment of the present invention. The apparatus can be implemented by using the methods illustrated in FIG. 1 to FIG. 4. As shown in FIG. 5, the apparatus includes:

a first creating unit 301, configured to create multiple virtual hardware systems of the control planes on a hardware system of a control plane of a physical network device.

The physical network device refers to a network device including hardware. For example, the network device may be a router, a switch, a firewall or a load balancer.

The hardware system of the control plane of the physical network device may be a physical main processing unit of a physical router.

The first creating unit 301 may be software or hardware. The software may be a hypervisor. For example, the hypervisor may be borne on the hardware system of the control plane of the physical network device. The hardware may be an application specific integrated circuit.

If the physical network device is a physical router, the hardware system of the control plane of the physical network device may include a CPU, a memory, and a physical interface of the control plane. The physical interface of the control plane may include a physical interface used to communicate with the forwarding plane.

a second creating unit 302, configured to create multiple virtual hardware systems of the forwarding planes on a hardware system of a forwarding plane of the physical network device.

The hardware system of the forwarding plane of the physical network device may be a physical line processing unit of the physical router.

The second creating unit 302 may be software or hardware. The software may be a hypervisor. For example, the hypervisor may be borne on the hardware system of the forwarding plane of the physical network device. The hardware may be an application specific integrated circuit.

If the first creating unit 301 and the second creating unit 302 are hypervisors, the hypervisor corresponding to the first creating unit and the hypervisor corresponding to the second creating unit 302 may be a same hypervisor. The hypervisor corresponding to the first creating unit and the hypervisor corresponding to the second creating unit 302 may be different hypervisors. For example, when the hardware system of the forwarding plane of the physical network device and the hardware system of the control plane of the physical network device are the physical line processing unit and the physical main processing unit, respectively, the hypervisor corresponding to the first creating unit 301 may be different from the hypervisor corresponding to the second creating unit 302. When the hardware system of the forwarding plane of the physical network device and the hardware system of the control plane of the physical network device are borne on the same chassis or borne on the same system on chip, the hypervisor corresponding to the first creating unit 301 and the hypervisor corresponding to the second creating unit 302 may be the same hypervisor.

If the physical network device is a physical router, the hardware system of the forwarding plane of the physical network device may include a CPU, a network processor, a memory, a traffic management chip, and a physical interface of the forwarding plane. The physical interface of the forwarding plane may include a physical interface used to communicate with the control plane.

a first loading unit 303, configured to load multiple software systems of the control planes to the multiple virtual hardware systems of the control planes, respectively, where the multiple virtual hardware systems of the control planes and the multiple software systems of the control planes are in one-to-one correspondence.

The first loading unit 303 may be performed by the hypervisor or a virtual network device management system. The virtual network device management system is configured to instruct a creating unit to create the multiple virtual hardware systems on the hardware system of the physical network device. The creating unit is software or hardware configured to create a virtual hardware system. The virtual network device management system may be located on the physical network device. The virtual network device management system may be a personal computer. When the virtual network device management system is a personal computer, the virtual network device management system can communicate with the physical network device by using a communication interface. When the first loading unit 303 is a hypervisor, the virtual network device management system can instruct the hypervisor to perform operations corresponding to the first loading unit 303.

The multiple software systems of the control planes include at least two software systems of control planes. If the multiple software systems of the control planes include two software systems of the control planes, the two software systems of the control planes may be a same software system of a control plane or be different software systems of the control planes.

For example, the software system of the control plane may be a versatile routing platform provided by Huawei Technologies. The software system of the control plane may also be an IOS provided by Cisco Systems. Software systems of control planes in different versions may be different software systems of the control planes. For example, a versatile routing platform version 5 and a versatile routing platform version 8 are different software systems of the control planes.

a second loading unit 304, configured to load multiple software systems of the forwarding planes to the multiple virtual hardware systems of the forwarding planes, respectively, where the multiple virtual hardware systems of the forwarding planes and the multiple software systems of the forwarding planes are in one-to-one correspondence.

The second loading unit 304 may be a hypervisor or the virtual network device management system. When the second loading unit 304 is a hypervisor, the virtual network device management system can instruct the hypervisor to perform operations corresponding to the second loading unit 304.

The multiple software systems of the forwarding planes include at least two software systems of forwarding planes. If the multiple software systems of the forwarding planes include two software systems of forwarding planes, the two software systems of the forwarding planes may be a same software system of a forwarding plane or be different software systems of the forwarding planes.

a third creating unit 305, configured to create multiple communication channels, where the multiple communication channels are communication channels between the multiple software systems of the control planes and the multiple software systems of the forwarding planes, the multiple communication channels and the multiple software systems of the control planes are in one-to-one correspondence, and the multiple communication channels and the multiple software systems of the forwarding planes are in one-to-one correspondence.

The third creating unit 305 may be performed by the virtual network device management system. The third creating unit 305 may also be a hypervisor.

The multiple communication channels are channels through which the multiple software systems of the control planes communicate with the multiple software systems of the forwarding planes.

For example, the multiple communication channels may be mapping relationships. For example, the mapping relationships may be mapping tables. The mapping relationships may include a first mapping relationship and a second mapping relationship. The first mapping relationship is a mapping relationship that needs to be used for transmitting a first packet from the multiple software systems of the forwarding planes to the multiple software systems of the control planes. The first packet may be a packet received by the physical network device. The second mapping relationship is a mapping relationship that needs to be used for transmitting a second packet from the multiple software systems of the control planes to the multiple software systems of the forwarding planes. The second packet may be a packet received by the physical network device or be a packet generated by the physical network device.

For example, the multiple software systems of the forwarding planes and the multiple software systems of the control planes are in one-to-one correspondence. Each of the multiple software systems of the forwarding planes may include one or more virtual line processing units. Each of the multiple software systems of the control planes may include one or more virtual main processing units. For example, according to the apparatus illustrated in FIG. 5, multiple virtual network devices can be created. The multiple virtual network devices include the multiple software systems of the forwarding planes and the multiple software systems of the control planes. Any one virtual network device of the multiple virtual network devices includes a software system of a forwarding plane corresponding to the virtual network device and a software system of a control plane corresponding to the virtual network device. Each of the multiple virtual network devices may include at least one virtual main processing unit and at least one virtual line processing unit. Each virtual main processing unit of the at least one virtual main processing unit corresponds to an identity of the virtual main processing unit. Each virtual line processing unit of the at least one virtual line processing unit corresponds to an identity of the virtual line processing unit. Each of the multiple virtual network devices corresponds to an identity of the virtual network device.

For example, the first mapping relationship may include a first matching domain and a first action domain. The first matching domain may include a physical ingress interface of the physical network device used to receive the first packet. The first action domain may further include one or more fields in a header of the first packet. The first matching domain is used to determine whether the packet received by the physical network device matches the first mapping relationship. The first action domain may include an identity of a first virtual network device, where the first virtual network device is one of the multiple virtual network devices. The first action domain may further include an identity of a virtual main processing unit in the first virtual network device. The identity of the first virtual network device in the first action domain is used to indicate that an entity processing the first packet is the first virtual network device. The identity of a virtual main processing unit in the first virtual network device is used to indicate a destination unit of the first packet.

For example, the first mapping relationship may be generated by the virtual network device management system, and may also be generated by the hypervisor borne on the hardware system of the forwarding plane of the physical network device. Specifically, in a scenario in which the virtual network device management system generates the first mapping relationship, a user can log in to the virtual network device management system, and enters a first command line to the virtual network device management system. The virtual network device management system generates the first mapping relationship according to the first command line, and loads the first mapping relationship to the software systems of the service plane of the physical network device. In a scenario in which the hypervisor borne on the hardware system of the forwarding plane of the physical network device generates the first mapping relationship, the virtual network device management system sends a rule for generating the first mapping relationship to a hypervisor borne on the hardware system of the forwarding plane of the physical network device. After receiving the rule for generating the first mapping relationship, the hypervisor borne on the hardware system of the service plane of the physical network device generates the first mapping relationship according to the rule for generating the first mapping relationship. The following describes how the physical network device processes the first packet according to the first mapping relationship after receiving the first packet. For example, after the hardware system of the forwarding plane of the physical network system receives the first packet, the hypervisor borne on the hardware system of the forwarding plane of the physical network device can determine, according to the first mapping relationship, that an entity processing the first packet is the first virtual network device and a destination unit of the first packet is a virtual main processing unit of the first virtual network device. The hypervisor borne on the hardware system of the forwarding plane of the physical network device sends the first packet to the hardware system of the control plane of the physical network device. The hypervisor borne on the hardware system of the control plane of the physical network device instructs a virtual main processing unit corresponding to the identity of a virtual main processing unit in the first virtual network device in the first action domain to process the first packet. For example, the second mapping relationship may include a second matching domain and a second action domain. The second matching domain may include an identity of a virtual line processing unit configured to forward the second packet. The second action domain may further include one or more fields in a header of the second packet. The second matching domain is used to determine whether the packets received by the multiple software systems of the control planes match the second mapping relationship. The second action domain may include an identity of a second virtual network device, where the second virtual network device is one of the multiple virtual network devices. The second action domain may further include an identity of a virtual line processing unit in the second virtual network device. The identity of the second virtual network device in the second action domain is used to indicate that an entity processing the second packet is the second virtual network device. The identity of a virtual line processing unit in the second virtual network device is used to indicate a destination unit of the second packet.

For example, the second mapping relationship may be generated by the virtual network device management system, and may also be generated by the hypervisor borne on the hardware system of the control plane of the physical network device. Specifically, in a scenario in which the virtual network device management system generates the second mapping relationship, a user can log in to the virtual network device management system, and enters a second command line to the virtual network device management system. The virtual network device management system generates the second mapping relationship according to the second command line, and loads the second mapping relationship to the software systems of the control plane of the physical network device. In a scenario in which the hypervisor borne on the hardware system of the control plane of the physical network device generates the second mapping relationship, the virtual network device management system sends a rule for generating the second mapping relationship to a hypervisor borne on the hardware system of the control plane of the physical network device. After receiving the rule for generating the second mapping relationship, the hypervisor borne on the hardware system of the control plane of the physical network device generates the second mapping relationship according to the rule for generating the second mapping relationship. The following describes how the physical network device processes the second packet according to the second mapping relationship. For example, after the hardware system of the control plane of the physical network system receives the second packet, the hypervisor borne on the hardware system of the control plane of the physical network device can determine, according to the second mapping relationship, that an entity processing the second packet is the second virtual network device and a destination unit of the second packet is a virtual line processing unit of the second virtual network device. The hypervisor borne on the hardware system of the control plane of the physical network device sends the second packet to the hardware system of the forwarding plane of the physical network device. The hypervisor borne on the hardware system of the control plane of the physical network device instructs a virtual line processing unit corresponding to the identity of a virtual line processing unit in the second virtual network device in the second action domain to process the second packet. In the foregoing technical solution, the hardware system of the physical network device is created as multiple virtual hardware systems. Therefore, software systems in different versions can be loaded in the multiple virtual hardware systems, respectively. Therefore, by using the technical solution provided by the embodiment of the present invention, multiple virtual network devices can run software systems in different versions.

Figure 6:
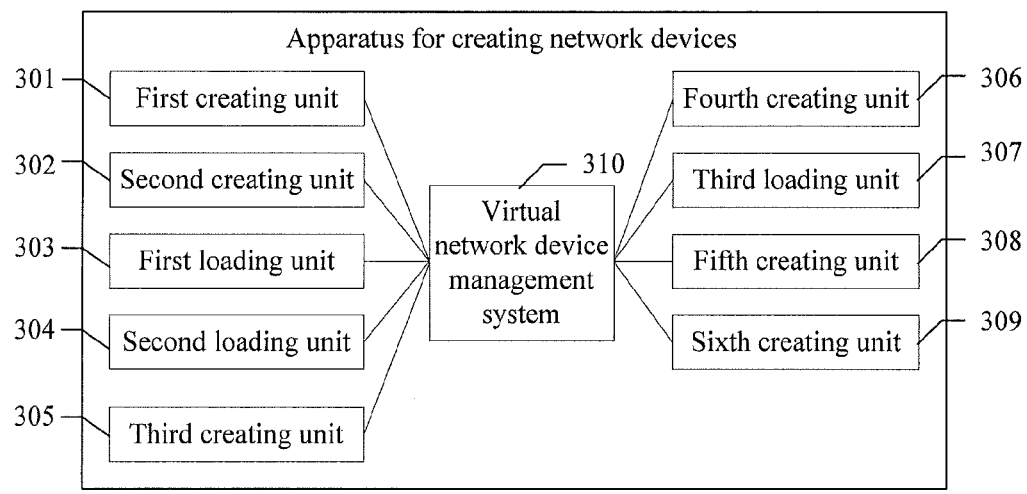
FIG. 6 is another schematic structural diagram of an apparatus for creating network devices according to an embodiment of the present invention.

Alternatively, the apparatus illustrated in FIG. 5 can be extended. For details, reference may be made to FIG. 6.

Alternatively, the apparatus illustrated in FIG. 5 may further include:

a fourth creating unit 306, configured to create multiple virtual hardware systems of the service planes on a hardware system of a service plane of the physical network device.

For example, a service corresponding to a software system of a service plane in the multiple software systems of the service planes may be a firewall service, a network address translation service or a video service.

The hardware system of the service plane of the physical network device may be a physical service processing unit of the physical router.

The fourth creating unit 306 may be software or hardware. The software may be a hypervisor. For example, the hypervisor may be borne on the hardware system of the service plane of the physical network device. The hardware may be an application specific integrated circuit.

If the physical network device is a physical router, the hardware system of the service plane of the physical network device may include a CPU, a memory, and a physical interface of the service plane. The physical interface of the service plane may include a physical interface used to communicate with the forwarding plane. The physical interface of the forwarding plane may also include a physical interface used to communicate with the control plane.

a third loading unit 307, configured to load multiple software systems of the service planes to the multiple virtual hardware systems of the service planes, respectively, where the multiple virtual hardware systems of the service planes and the multiple software systems of the service planes are in one-to-one correspondence.

The third loading unit 307 may be a hypervisor or the virtual network device management system. When the third loading unit 307 is a hypervisor, the virtual network device management system can instruct the hypervisor to perform operations corresponding to the third loading unit 307.

The multiple software systems of the service planes include at least two software systems of service planes. If the multiple software systems of the service planes include two software systems of service planes, the two software systems of the service planes may be a same software system of a service plane or different software systems of the service planes.

a fifth creating unit 308, configured to create multiple first communication channels, where the multiple first communication channels are communication channels between the multiple software systems of the control planes and the multiple software systems of the service planes, the multiple first communication channels and the multiple software systems of the control planes are in one-to-one correspondence, and the multiple first communication channels and the multiple software systems of the service planes are in one-to-one correspondence.

The fifth creating unit 308 may be performed by the virtual network device management system. The fifth creating unit 308 may also be a hypervisor. For example, the fifth creating unit 308 may be the hypervisor borne on the hardware system of the control plane of the physical network device and the hypervisor borne on the hardware system of the service plane of the physical network device.

For example, the multiple communication channels are channels through which the multiple software systems of the control planes communicate with the multiple software systems of the service planes. For details about the multiple first communication channels, reference may be made to the mapping relationships, which are not further described herein.

For example, the multiple software systems of the service planes and the multiple software systems of the control planes are in one-to-one correspondence. Each of the multiple software systems of the service planes may include one or more virtual service processing units. For example, according to the apparatus illustrated in FIG. 5, multiple virtual network devices can be created. The multiple virtual network devices include the multiple software systems of the forwarding planes, the multiple software systems of the control planes, and the multiple software systems of the service planes. Any one virtual network device of the multiple virtual network devices includes a software system of a forwarding plane corresponding to the virtual network device and a software system of a control plane corresponding to the virtual network device. Each of the multiple virtual network devices may include at least one virtual service processing unit. Each virtual line processing unit of the at least one virtual service processing units corresponds to an identity of the virtual line processing unit.

a sixth creating unit 309, configured to create multiple second communication channels, where the multiple second communication channels are communication channels between the multiple software systems of the forwarding planes and the multiple software systems of the service planes, the multiple second communication channels and the multiple software systems of the forwarding planes are in one-to-one correspondence, and the multiple second communication channels and the multiple software systems of the service planes are in one-to-one correspondence.

The sixth creating unit 309 may be the virtual network device management system. The sixth creating unit 309 may also be a hypervisor. For example, the sixth creating unit 309 may be the hypervisor borne on the hardware system of the forwarding plane of the physical network device and the hypervisor borne on the hardware system of the service plane of the physical network device.

For example, the multiple second communication channels are channels through which the multiple software systems of the forwarding planes communicate with the multiple software systems of the service planes. For details about the multiple second communication channels, reference may be made to the mapping relationships, which are not further described herein.

Alternatively, in the apparatus illustrated in FIG. 5, the apparatus further includes a virtual network device management system 310, where the virtual network device management system 310 is configured to instruct the first creating unit 301 to create the multiple virtual hardware systems of the control planes.

For example, the creating unit of the control plane is software or hardware configured to create a virtual hardware system of a control plane. For example, the software configured to create the virtual hardware system may be the hypervisor borne on the hardware system of the control plane of the physical network device.

Alternatively, in the apparatus illustrated in FIG. 5, the virtual network device management system 310 is further configured to instruct the second creating unit 302 to create the hardware system of the forwarding planes of the physical network device as the multiple virtual hardware systems of the forwarding planes.

For example, the creating unit of the forwarding plane is software or hardware configured to create a virtual hardware system of a forwarding plane. For example, the software configured to create the virtual hardware system may be the hypervisor borne on the hardware system of the forwarding plane of the physical network device.

Alternatively, in the apparatus illustrated in FIG. 5, the virtual network device management system 310 is further configured to instruct the first loading unit 303 to load the multiple software systems of the control planes to the multiple virtual hardware systems of the control planes, respectively, where the first loading unit is the first creating unit; or the virtual network device management system 310 is further configured to load the multiple software systems of the control planes to the multiple virtual hardware systems of the control planes, respectively, where the virtual network device management system 310 is the first loading unit 303.

Alternatively, in the apparatus illustrated in FIG. 5, the virtual network device management system 310 is further configured to instruct the second loading unit 304 to load the multiple software systems of the forwarding planes to the multiple virtual hardware systems of the forwarding planes, respectively, where the second loading unit is the second creating unit; or the virtual network device management system 310 is further configured to load the multiple software systems of the forwarding planes to the multiple virtual hardware systems of the forwarding planes, respectively, where the virtual network device management system 310 is the second loading unit 304.

Alternatively, in the apparatus illustrated in FIG. 5, the apparatus may further include a virtual network device management system 310, where the virtual network device management system 310 is configured to instruct the fourth creating unit 306 to create the multiple virtual hardware systems of the service planes.

For example, the creating unit of the service plane is software or hardware configured to create virtual hardware systems of the service plane. For example, the software configured to create virtual hardware systems may be a hypervisor borne on the hardware system of the service plane of the physical network device.

Alternatively, in the apparatus illustrated in FIG. 5, the virtual network device management system 310 is further configured to instruct the third loading unit 307 to load the multiple software systems of the service planes to the multiple virtual hardware systems of the service planes, respectively, where the third loading unit is the fourth creating unit; or the virtual network device management system is further configured to load the multiple software systems of the service planes to the multiple virtual hardware systems of the service planes, respectively, where the virtual network device management system 310 is the third loading unit 307.

Alternatively, in the apparatus illustrated in FIG. 5, the virtual network device management system 310 is further configured to instruct the fifth creating unit 308 to create the multiple first communication channels; or the virtual network device management system 310 is further configured to create the multiple first communication channels, where the virtual network device management system 310 is the fifth creating unit 308.

Alternatively, in the apparatus illustrated in FIG. 5, the virtual network device management system 310 is further configured to instruct the sixth creating unit 309 to create the multiple second communication channels; or the virtual network device management system 310 is further configured to create the multiple second communication channels, where the virtual network device management system 310 is the sixth creating unit 309.

Alternatively, in the apparatus illustrated in FIG. 5:

The first creating unit 301 is further configured to adjust one virtual hardware system of a control plane within the multiple virtual hardware systems of the control planes to generate a new virtual hardware system of a control plane; or The second creating unit 302 is configured to adjust one virtual hardware system of a forwarding plane within the multiple virtual hardware systems of the forwarding planes to generate a new virtual hardware system of a forwarding plane.

For example, one of the multiple virtual hardware systems of the control planes may include a memory. The memory may be one gigabyte. The memory of the new virtual hardware system of the control plane is two gigabytes.

For example, the one virtual hardware system of a forwarding plane within the multiple virtual hardware systems of the forwarding planes may include a memory. The memory may be one gigabyte. The memory of the new virtual hardware system of the forwarding plane may be two gigabytes.

It is understandable by persons skilled in the art that all exemplary units and steps of the method described in the embodiments of the present invention can be implemented by using electronic hardware or combination of computer software and electronic hardware.

Whether these functions are executed by hardware or software depends on specific applications and design constraints of the technical solution. Those skilled in the art can implement the described functions of each specific application by using different methods, but this implementation should not depart from the scope of the present invention.

It can be clearly known by persons skilled in the art that for better description, for details about specific working procedures of the foregoing system, apparatus, and unit, reference may be made to corresponding processes in the methods provided in the foregoing embodiments, which are not further described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device) to perform all or a part of the steps of the method described in the embodiment of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for creating network devices, comprising:
creating multiple virtual hardware systems of control planes on a hardware system of a control plane of a physical network device;
creating multiple virtual hardware systems of forwarding planes on a hardware system of a forwarding plane of the physical network device;
loading multiple software systems of the control planes to the multiple virtual hardware systems of the control planes, respectively, wherein the multiple virtual hardware systems of the control planes and the multiple software systems of the control planes are in one-to-one correspondence;
loading multiple software systems of the forwarding planes to the multiple virtual hardware systems of the forwarding planes, respectively, wherein the multiple virtual hardware systems of the forwarding planes and the multiple software systems of the forwarding planes are in one-to-one correspondence;
creating multiple communication channels, wherein the multiple communication channels are communication channels between the multiple software systems of the control planes and the multiple software systems of the forwarding planes, the multiple communication channels and the multiple software systems of the control planes are in one-to-one correspondence, and the multiple communication channels and the multiple software systems of the forwarding planes are in one-to-one correspondence;
creating multiple virtual hardware systems of service planes on a hardware system of a service plane of the physical network device;
loading multiple software systems of the service planes to the multiple virtual hardware systems of the service planes, respectively, wherein the multiple virtual hardware systems of the service planes and the multiple software systems of the service planes are in one-to-one correspondence and a service corresponding to a software system of the service planes is a firewall service, a network address translation service or a video service;
creating multiple first communication channels, wherein the multiple first communication channels are communication channels between the multiple software systems of the control planes and the multiple software systems of the service planes, the multiple first communication channels and the multiple software systems of the control planes are in one-to-one correspondence, and the multiple first communication channels and the multiple software systems of the service planes are in one-to-one correspondence; and
creating multiple second communication channels, wherein the multiple second communication channels are communication channels between the multiple software systems of the forwarding planes and the multiple software systems of the service planes, the multiple second communication channels and the multiple software systems of the forwarding planes are in one-toone correspondence, and the multiple second communication channels and the multiple software systems of the service planes are in one-to-one correspondence.

2. The method according to claim 1, wherein:
the creating multiple virtual hardware systems of control planes on a hardware system of a control plane of a physical network device comprises:
instructing, by a virtual network device management system, a creating unit of the control plane to create the multiple virtual hardware systems of the control planes on the hardware system of the control plane of the physical network device;
the creating multiple virtual hardware systems of forwarding planes on a hardware system of a forwarding plane of the physical network device comprises:
instructing, by the virtual network device management system, a creating unit of the forwarding plane to create the multiple virtual hardware systems of the forwarding planes on the hardware system of the forwarding plane of the physical network device;
the loading multiple software systems of the control planes to the multiple virtual hardware systems of the control planes, respectively, comprises:
instructing, by the virtual network device management system, the creating unit of the control plane to load the multiple software systems of the control planes to the multiple virtual hardware systems of the control planes, respectively; or
loading, by the virtual network device management system, the multiple software systems of the control planes to the multiple virtual hardware systems of the control planes, respectively; and
the loading multiple software systems of the forwarding planes to the multiple virtual hardware systems of the forwarding planes, respectively, comprises:
instructing, by the virtual network device management system, the creating unit of the forwarding plane to load the multiple software systems of the forwarding planes to the multiple virtual hardware systems of the forwarding planes, respectively; or
loading, by the virtual network device management system, the multiple software systems of the forwarding planes to the multiple virtual hardware systems of the forwarding planes, respectively.

3. The method according to claim 1, wherein: the creating multiple virtual hardware systems of the service planes on a hardware system of a service plane of the physical network device comprises: instructing, by a virtual network device management system, a creating unit of the service plane to create the multiple virtual hardware systems of the service planes on the hardware system of the service plane of the physical network device; the loading multiple software systems of the service planes to the multiple virtual hardware systems of the service planes, respectively, comprises: instructing, by the virtual network device management system, the creating unit of the service plane to load the multiple software systems of the service planes to the multiple virtual hardware systems of the service planes, respectively; or loading, by the virtual network device management system, the multiple software systems of the service planes to the multiple virtual hardware systems of the service planes, respectively; the creating multiple first communication channels comprises: instructing, by the virtual network device management system, the creating unit of the service plane to create the multiple first communication channels; or creating, by the virtual network device management system, the multiple first communication channels; and the creating multiple second communication channels comprises: instructing, by the virtual network device management system, the creating unit of the service plane to create the multiple second communication channels; or creating, by the virtual network device management system, the multiple second communication channels.

4. The method according to claim 1, further comprising:
adjusting one virtual hardware system of a control plane within the multiple virtual hardware systems of the control planes to generate a new virtual hardware system of a control plane; or
adjusting one virtual hardware system of a forwarding plane within the multiple virtual hardware systems of the forwarding planes to generate a new virtual hardware system of a forwarding plane.

5. An apparatus for creating network devices, the apparatus comprising a processor and a non-transitory computer readable medium including instructions that when executed by the processor cause the following to be performed:
create multiple virtual hardware systems of control planes on a hardware system of a control plane of a physical network device;
create multiple virtual hardware systems of forwarding planes on a hardware system of a forwarding plane of the physical network device;
load multiple software systems of the control planes to the multiple virtual hardware systems of the control planes, respectively, wherein the multiple virtual hardware systems of the control planes and the multiple software systems of the control planes are in one-to-one correspondence;
load multiple software systems of the forwarding planes to the multiple virtual hardware systems of the forwarding planes, respectively, wherein the multiple virtual hardware systems of the forwarding planes and the multiple software systems of the forwarding planes are in one-to-one correspondence;
create multiple communication channels, wherein the multiple communication channels are communication channels between the multiple software systems of the control planes and the multiple software systems of the forwarding planes, the multiple communication channels and the multiple software systems of the control planes are in one-to-one correspondence, and the multiple communication channels and the multiple software systems of the forwarding planes are in one-to-one correspondence;
create multiple virtual hardware systems of service planes on a hardware system of a service plane of the physical network device;
load multiple software systems of the service planes to the multiple virtual hardware systems of the service planes, respectively, wherein the multiple virtual hardware systems of the service planes and the multiple software systems of the service planes are in one-to-one correspondence and a service corresponding to a software system of the service planes is a firewall service, a network address translation service or a video service;
create multiple first communication channels, wherein the multiple first communication channels are communication channels between the multiple software systems of the control planes and the multiple software systems of the service planes, the multiple first communication channels and the multiple software systems of the control planes are in one-to-one correspondence, and the multiple first communication channels and the multiple software systems of the service planes are in one-to-one correspondence; and create multiple second communication channels, wherein the multiple second communication channels are communication channels between the multiple software systems of the forwarding planes and the multiple software systems of the service planes, the multiple second communication channels and the multiple software systems of the forwarding planes are in one-to-one correspondence, and the multiple second communication channels and the multiple software systems of the service planes are in one-to-one correspondence.

6. The apparatus according to claim 5, further comprising a virtual network device management system, wherein:

the virtual network device management system is configured to trigger the creating of the multiple virtual hardware systems of the control planes;

the virtual network device management system is further configured to trigger the creating of the multiple virtual hardware systems of the forwarding planes on the hardware system of the forwarding plane of the physical network device;

the virtual network device management system is further configured to trigger the loading of the multiple software systems of the control planes to the multiple virtual hardware systems of the control planes, respectively; or the virtual network device management system is further configured to load the multiple software systems of the control planes to the multiple virtual hardware systems of the control planes, respectively; and the virtual network device management system is further configured to trigger the loading of the multiple software systems of the forwarding planes to the multiple virtual hardware systems of the forwarding planes, respectively; or the virtual network device management system is further configured to load the multiple software systems of the forwarding planes to the multiple virtual hardware systems of the forwarding planes, respectively.

7. The apparatus according to claim 5, further comprising a virtual network device management system, wherein:

the virtual network device management system is configured to trigger the creating of the multiple virtual hardware systems of the service planes;

the virtual network device management system is further configured to trigger the loading of the multiple software systems of the service planes to the multiple virtual hardware systems of the service planes, respectively; or the virtual network device management system is further configured to load the multiple software systems of the service planes to the multiple virtual hardware systems of the service planes, respectively;

the virtual network device management system is further configured to trigger the creating of the multiple first communication channels; or the virtual network device management system is further configured to create the multiple first communication channels; and the virtual network device management system is further configured to trigger the creating of the multiple second communication channels; or the virtual network device management system is further configured to create the multiple second communication channels.

8. The apparatus according to claim 5, wherein:

wherein the instructions further cause the processor to:

adjust one virtual hardware system of a control plane within the multiple virtual hardware systems of the control planes to generate a new virtual hardware system of a control plane; or adjust one virtual hardware system of a forwarding plane within the multiple virtual hardware systems of the forwarding planes to generate a new virtual hardware system of a forwarding plane.

* * * * *